US012758048B2

(12) United States Patent
Toubeaux et al.

(10) Patent No.: US 12,758,048 B2
(45) Date of Patent: Oct. 13, 2026

(54) CITRUS PRESS WITH AN INFLATABLE MEMBRANE INCLUDING A MOVABLE CANNULA

(71) Applicant: SARL JNIUS, Armentieres (FR)

(72) Inventors: Jean François Toubeaux, Armentieres (FR); Michaël P. M. Verleyen, Liege (BE); Franck Thirion, Coutiches (FR)

(73) Assignee: SARL JNIUS

( * ) Notice: Subject to any disclaimer, the term of this patent is extended or adjusted under 35 U.S.C. 154(b) by 711 days.

(21) Appl. No.: 18/038,216

(22) PCT Filed: Oct. 8, 2021

(86) PCT No.: PCT/EP2021/077861
§ 371 (c)(1),
(2) Date: May 23, 2023

(87) PCT Pub. No.: WO2022/111899
PCT Pub. Date: Jun. 2, 2022

(65) Prior Publication Data

US 2024/0000257 A1 Jan. 4, 2024

(30) Foreign Application Priority Data

Nov. 24, 2020 (FR) ........................................ 2012058

(51) Int. Cl.
*A47J 19/02* (2006.01)

(52) U.S. Cl.
CPC ...................................... *A47J 19/02* (2013.01)

(58) Field of Classification Search
CPC .. B26D 3/24; B26D 3/245; B26D 3/26; B30B 9/00; B30B 9/02; B30B 9/04; B30B 9/062; B30B 9/22; B30B 9/225; A23N 1/00; A23N 1/003; A47J 19/02; A47J 19/023
See application file for complete search history.

(56) References Cited

U.S. PATENT DOCUMENTS

| | | | | |
|---|---|---|---|---|
| 2,848,939 A | | 8/1958 | Warner | |
| 4,917,007 A | * | 4/1990 | Nelson | A23N 4/18 99/545 |
| 5,075,122 A | | 12/1991 | Barron | |
| 9,642,486 B1 | * | 5/2017 | Obiora | A23F 3/18 |
| 11,357,253 B2 | | 6/2022 | Toubeaux | |
| 2007/0125244 A1 | * | 6/2007 | Hensel | A47J 19/025 99/501 |

FOREIGN PATENT DOCUMENTS

| | | | | |
|---|---|---|---|---|
| CN | 107898287 B | * | 8/2020 | A47J 19/02 |
| WO | 2017/158278 A2 | | 9/2017 | |

* cited by examiner

*Primary Examiner* — Hung D Nguyen
(74) *Attorney, Agent, or Firm* — Brian Gordaychik

(57) ABSTRACT

The invention relates to a citrus press comprising an enclosure for receiving fruit to be squeezed, an extensible and inflatable membrane to compress the fruit fitted onto the cannula in order to extract the fluid therefrom, and a cannula including an inner duct connecting a perforation to an outlet orifice for the removal of fluid from the cannula. The citrus press further includes a displacement device for moving the cannula in translation relative to the enclosure, between an active position in which the cannula extends into the enclosure to fit the fruit and a release position in which the cannula is under the enclosure to allow the release of the squeezed fruit through a lower opening of the enclosure.

17 Claims, 7 Drawing Sheets

[Fig.1]
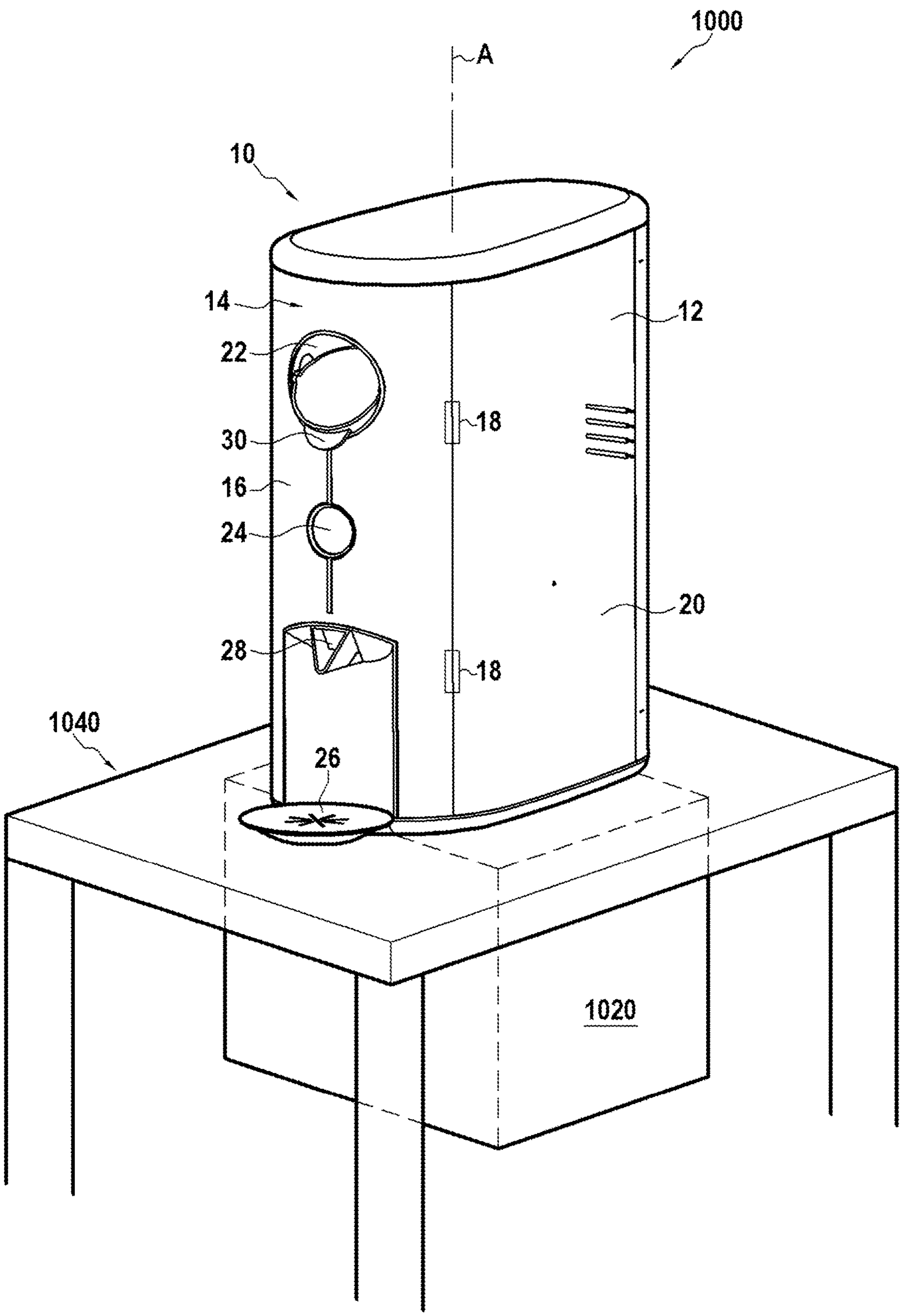

[Fig. 2]
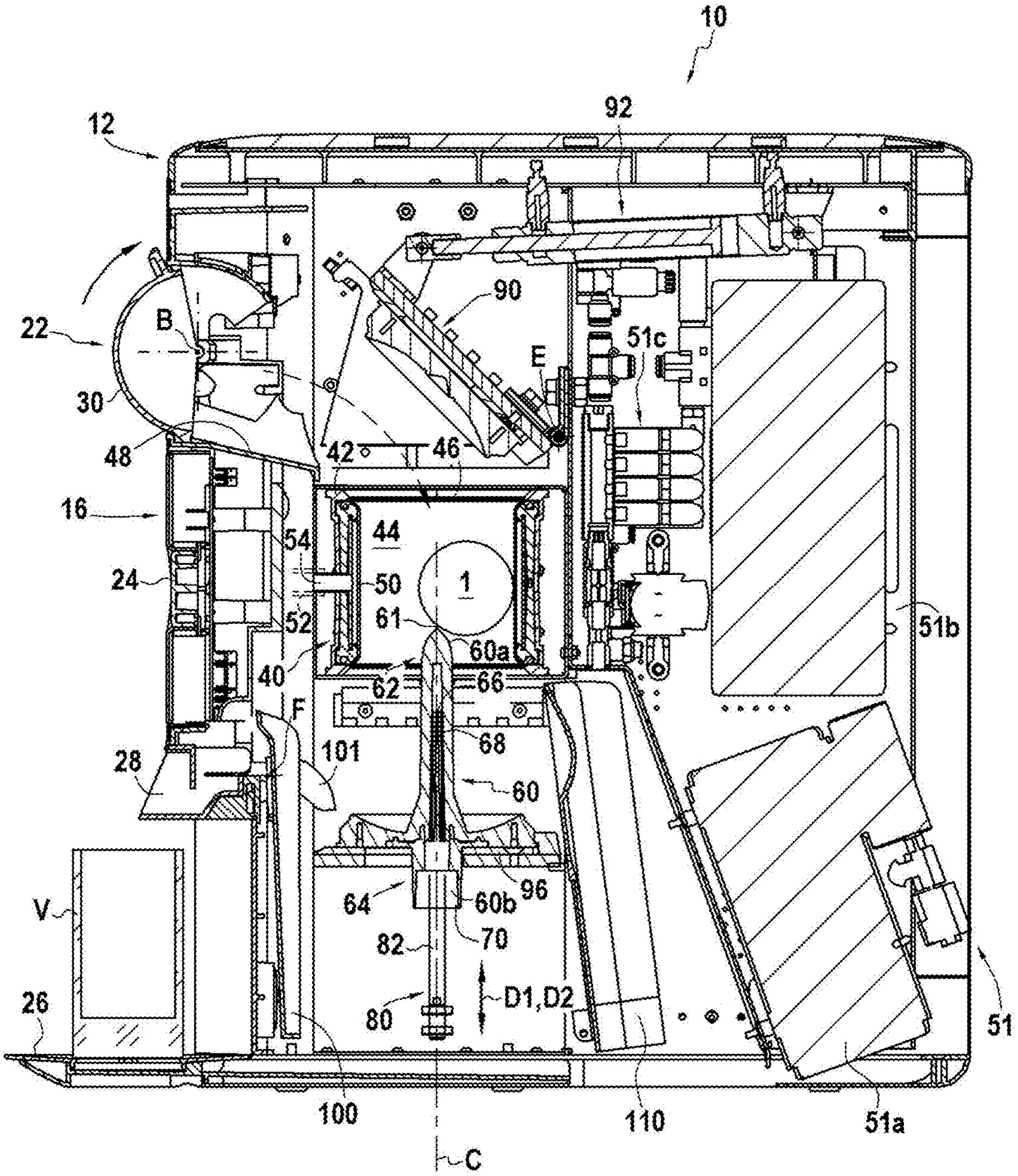

[Fig. 3]
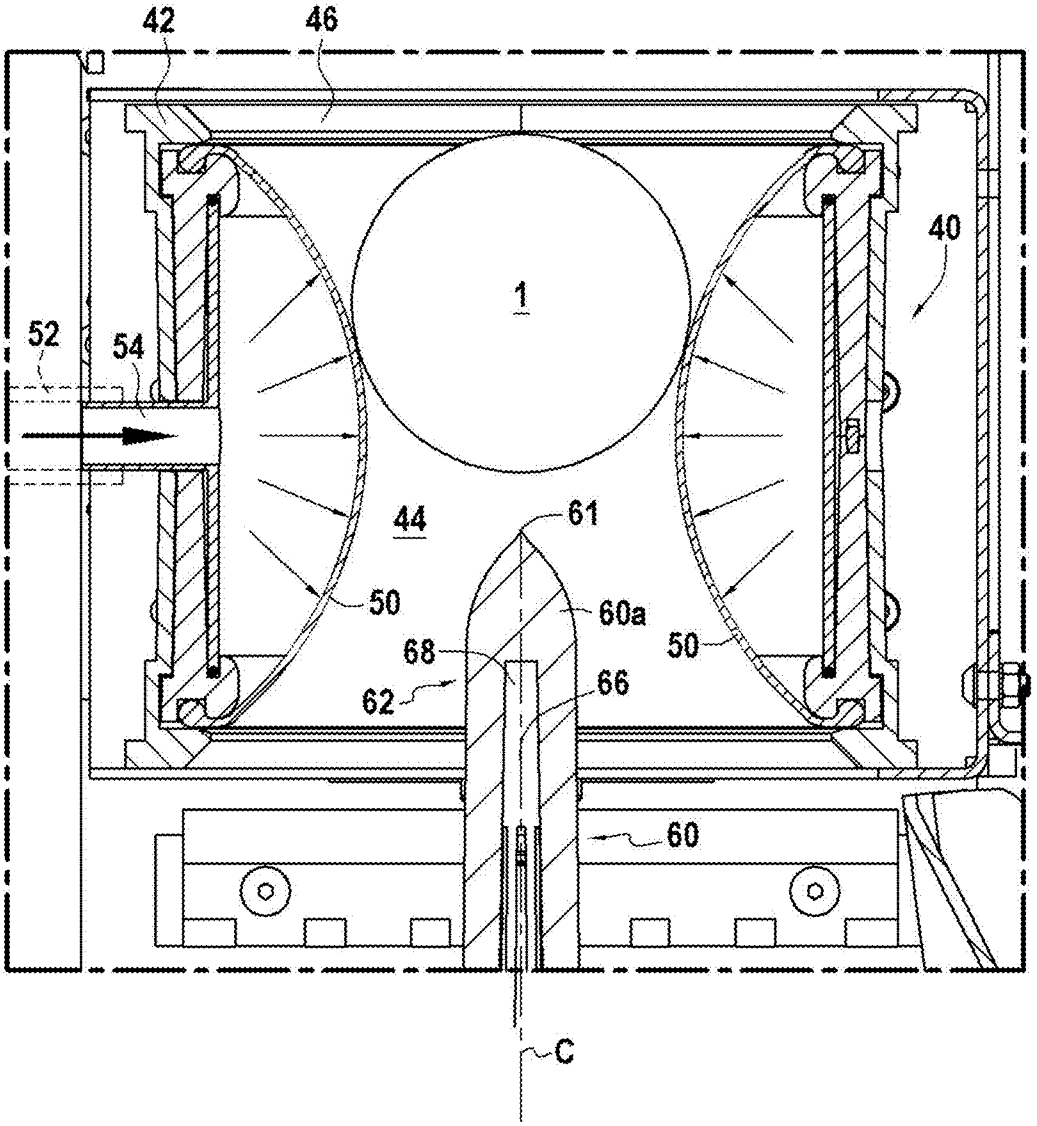

[Fig.4]
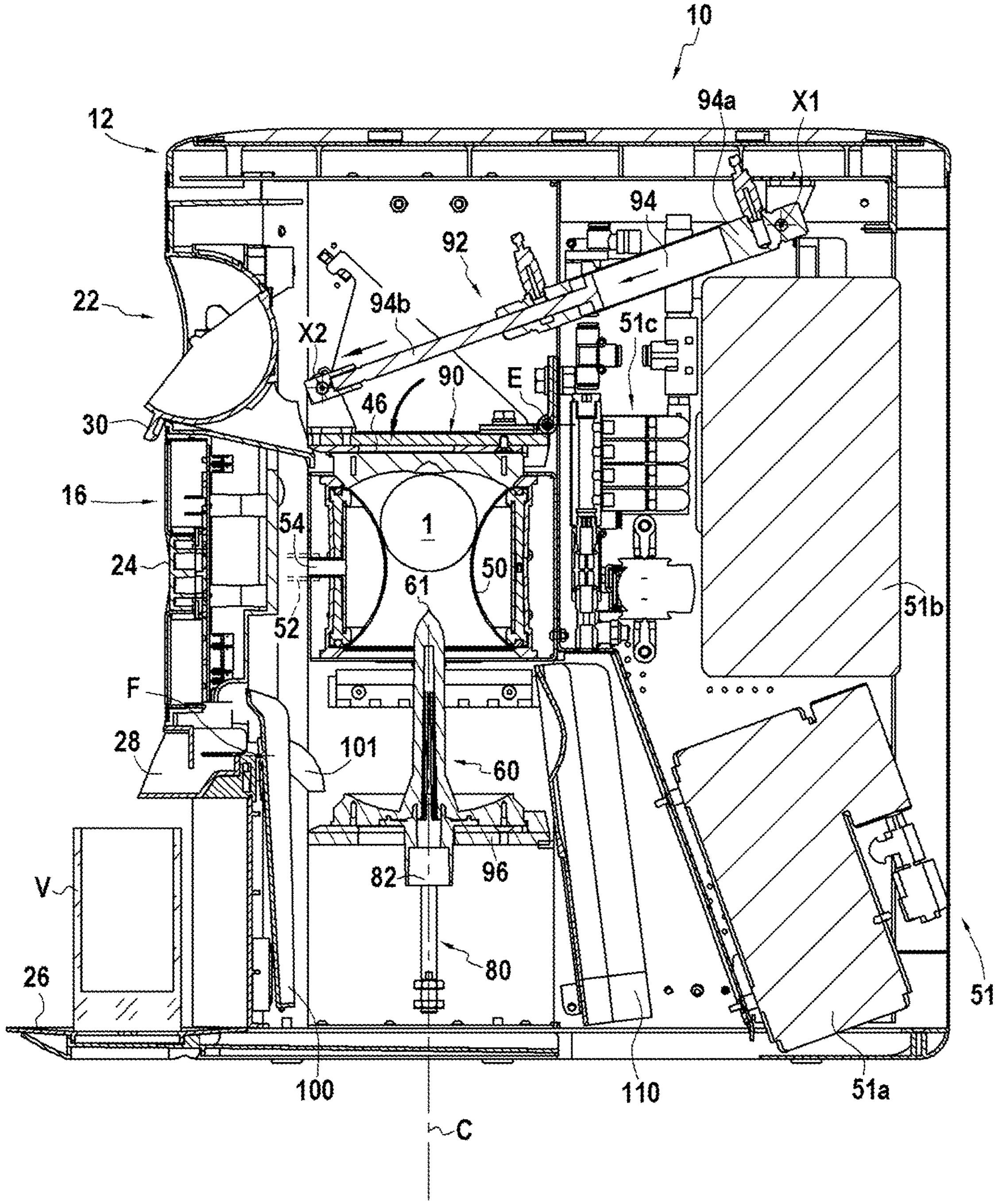

[Fig.5]
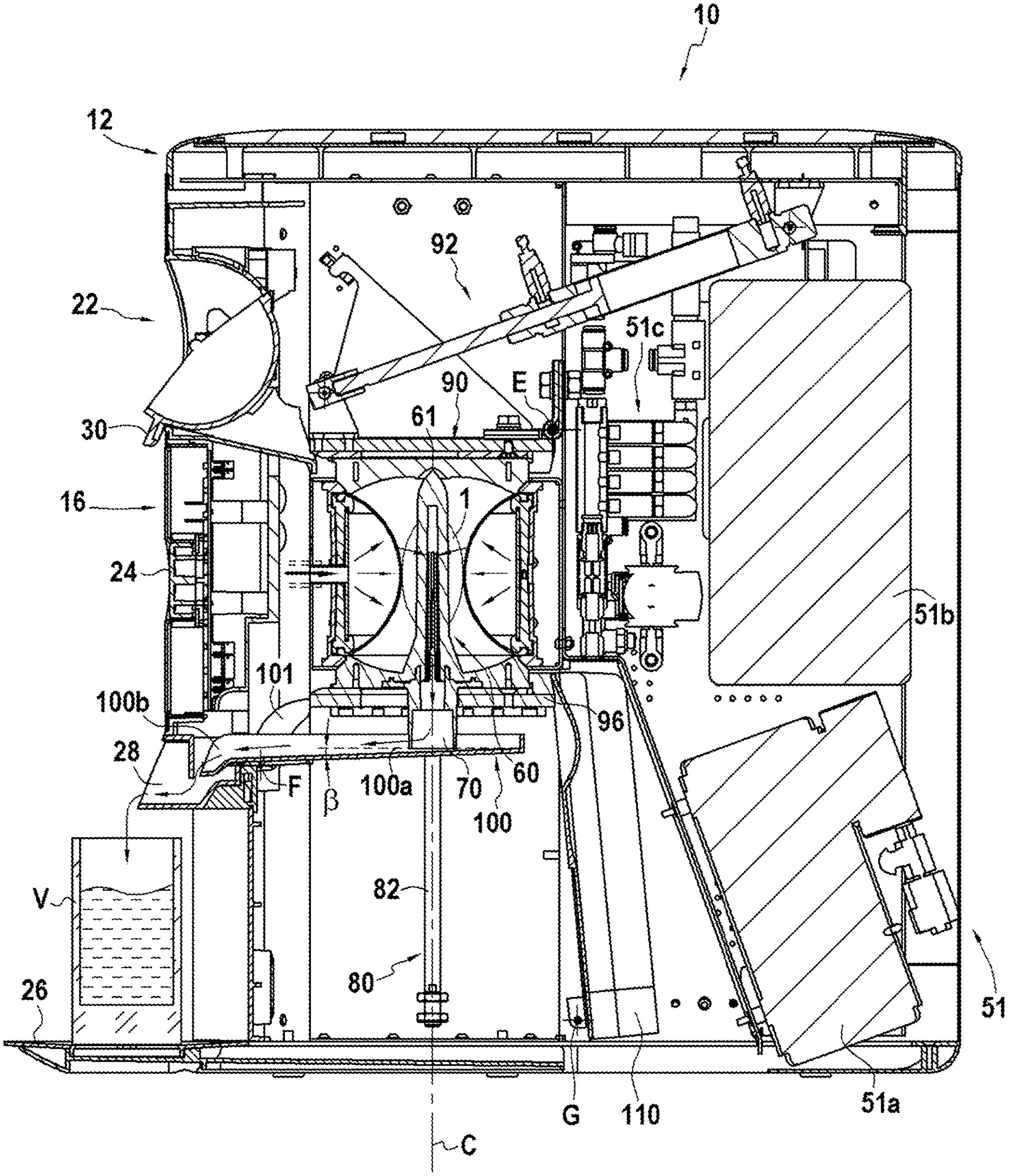

[Fig.6]
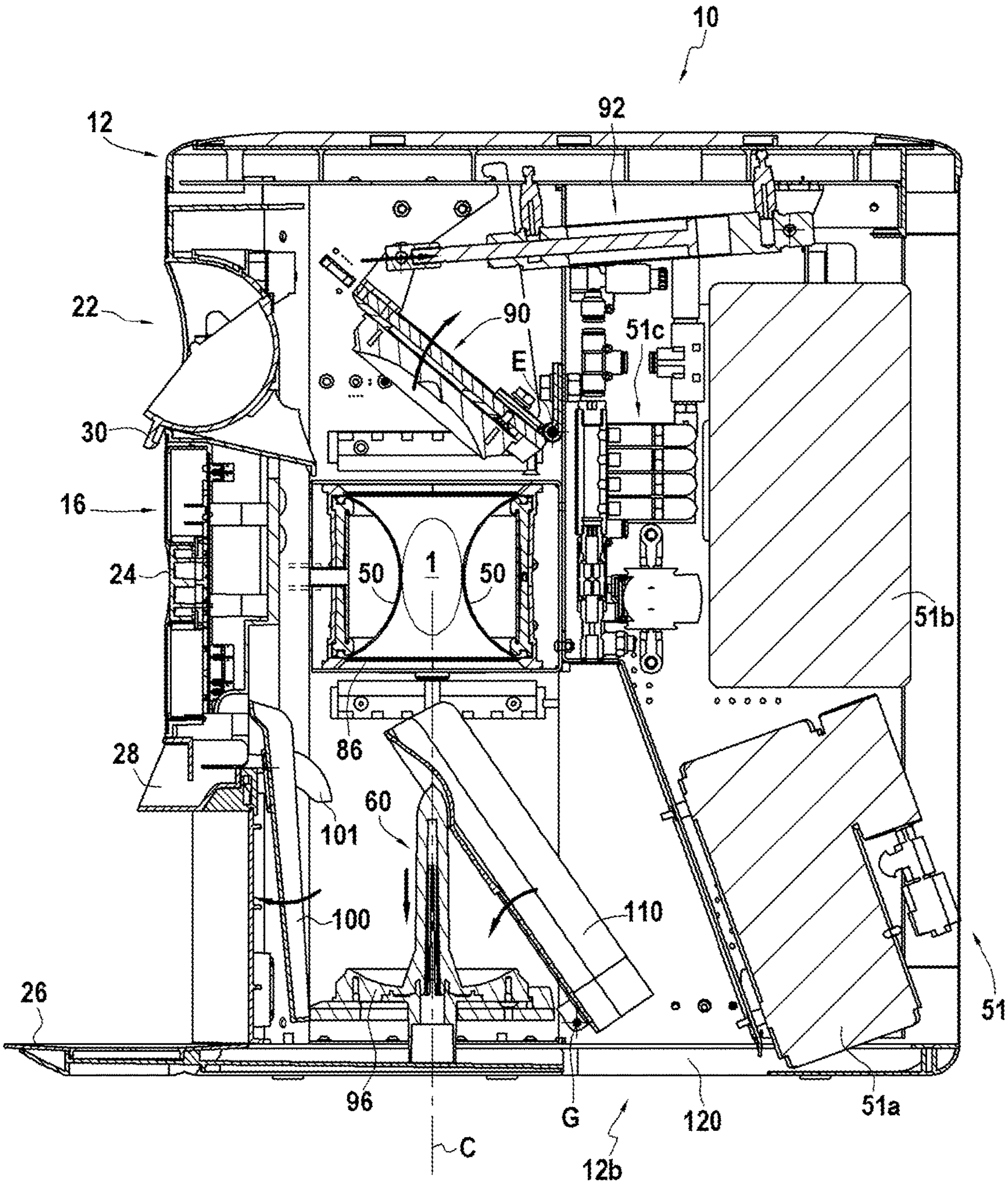

[Fig.7]
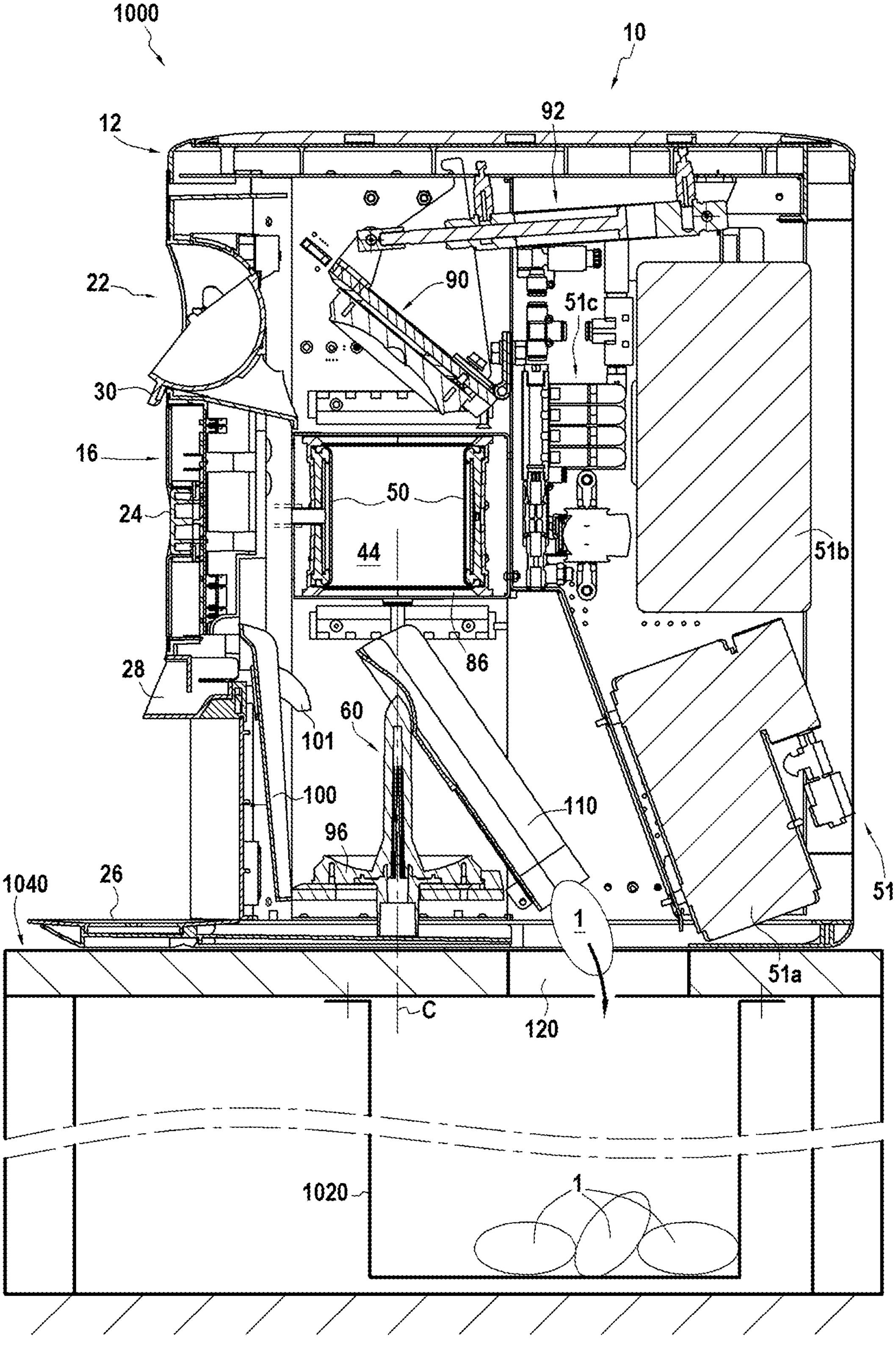

CITRUS PRESS WITH AN INFLATABLE MEMBRANE INCLUDING A MOVABLE CANNULA

TECHNICAL FIELD

The present disclosure relates to a citrus press. It finds particularly an application for the preparation of juice, from citrus fruits, for example in a catering space or in a private setting.

BACKGROUND

Known manual citrus presses have included a frustoconical portion against which a fruit portion can be squeezed, in order to extract the juice therefrom.

Such devices however require significant efforts from the user, and are also messy, particularly due to splashes of juice; for this reason, their use also requires a lot of time from the user, both for the operations prior to their use such as the cutting of the fruits, and for the subsequent operations such as the cleaning of the device and of the environment in which it was used.

Partially automatic citrus presses are also known, making it possible to limit the efforts required from the user.

Citrus presses with a membrane are also known, such as the citrus press described in the document WO2017158278. Such a citrus press comprises:

- a frame;
- an enclosure disposed in the frame and having a wall delimiting a cavity for receiving a fruit to be squeezed containing a fluid, the enclosure having an axis and an upper opening for the introduction of the fruit to be squeezed into the cavity;
- an extensible membrane disposed in the cavity and extending over all or part of the wall so as to surround the fruit to be squeezed when it is in the enclosure,
- a cannula provided with at least one perforation, the cannula extending parallel to the axis of the enclosure and being configured to be engaged in the fruit to be squeezed, the cannula including an inner duct connecting the perforation to an outlet orifice disposed below the cavity for the removal of the fluid from the cannula;
- an inflation device configured to inflate the extensible membrane, so as to compress the fruit to be squeezed fitted onto the cannula in order to extract the fluid therefrom.

In the known machine, the cannula is fixed relative to the enclosure. Consequently, when the fruit to be squeezed is introduced into the enclosure, it is pierced by the cannula. Then the membrane is inflated to squeeze the fruit. The juice flows out of the enclosure via the inner duct. After squeezing, the membrane is deflated and the squeezed fruit is then removed from the enclosure through its upper opening by the upward displacement of a movable plate. Then, an arm pushes the squeezed fruit towards a receptacle disposed behind the enclosure.

While this machine is satisfactory for home use, the cycle time may not be short enough for use in a collective catering space, such as a hotel or bar breakfast room, or any catering place.

SUMMARY

One aim of the present disclosure is to provide a citrus press overcoming the aforementioned drawbacks.

The present disclosure achieves its aim by the fact that the citrus press further includes a displacement device for moving the cannula in translation relative to the enclosure along a first direction of displacement parallel to the axis, between an active position in which the cannula extends at least partly into the enclosure to fit the fruit to be squeezed and a release position in which the cannula is disposed below the enclosure to allow the release of the squeezed fruit out of the enclosure through a lower opening of the enclosure.

The removal out of the enclosure is carried out simply and quickly by deflating the membrane, the squeezed fruit then leaves the enclosure under the action of gravity. It is understood that the cannula is moved into the release position while the membrane is still inflated so that the cannula does not carry with it the squeezed fruit during its translation towards the low release position.

Thanks to the present disclosure, the removal of the squeezed fruit is achieved faster than in the prior art since it does not require pushing the squeezed fruit towards the receptacle. Furthermore, the removal of the squeezed fruit through the lower opening of the enclosure advantageously makes it possible to arrange a large waste receptacle under the machine thereby allowing the squeezed fruit to leave the enclosure and fall into the receptacle through the action of gravity.

As a variant, the fruit can be received in the enclosure after having pre-inflated the membrane. This makes it possible to center the fruit relative to the axis of the enclosure. This centering makes it possible to correct the position of the fruit relative to the cannula, whereby the cannula fits the fruit in its center, thus optimizing the extraction of the juice. This also makes it possible to reduce the cycle time as long as the fruit is correctly placed when it enters the enclosure.

The displacement device preferably includes a motorized actuator, for example an electric or pneumatic cylinder, or any other actuator allowing the translational displacement of the cannula.

Preferably, but not exclusively, the membrane is made of an elastomeric material, preferably silicone or EPDM.

Advantageously, the citrus press further comprises a lid configured to obturate the upper opening, the lid being movable relative to the enclosure between an open position allowing the fruit to be squeezed to enter the enclosure via the upper opening, and a closed position in which the upper opening is obturated by the lid.

It is understood that the lid is in the closed position during the extraction step. The citrus press advantageously includes a motorized actuator, such as a cylinder or a motor, to move the lid between its open position and its closed position.

Preferably, the lid is pivotally mounted relative to the enclosure about a first pivot axis which is orthogonal to the axis of the enclosure. Preferably, the first pivot axis is disposed at a height greater than that of the upper opening of the enclosure. The first pivot axis is substantially perpendicular to the direction of engagement of the fresh fruit in the frame.

Advantageously, the citrus press further includes a bottom wall configured to obturate the lower opening of the enclosure, the bottom wall being movable relative to the enclosure along a second direction of displacement parallel to the axis of the enclosure, between an obturation position in which the bottom wall obturates at least part of the lower opening, and a low position.

It is understood that the bottom wall is in the obturation position during the juice extraction step, while it is in the low position during the removal of the squeezed fruit out of the enclosure.

Also, during the juice extraction step, the enclosure is closed by the lid on the one hand, and by the bottom wall on the other hand.

The citrus press preferably includes a motorized actuator, such as a cylinder or a rack, to move the bottom wall relative to the enclosure. The displacement movement of the bottom wall relative to the enclosure is a translation along the second direction of displacement.

The distance of displacement of the bottom wall relative to the enclosure is configured to free up enough space to allow the squeezed fruit to leave the enclosure.

According to one advantageous aspect of the present disclosure, the bottom wall is secured to the cannula.

It is therefore understood that the bottom wall and the cannula move in translation together as a single block. The displacement device for moving the cannula also allows the translational displacement of the bottom wall. The cannula extends perpendicularly relative to the bottom wall. Preferably, the cannula extends through the bottom wall. The portion of the cannula that comprises the perforation extends above the bottom wall.

Advantageously, the bottom wall is in the obturation position when the cannula is in the active position. In other words, the obturation position of the bottom wall corresponds to the active position of the cannula.

Preferably, the cannula has a portion extending below the bottom wall. This portion preferably constitutes the lower end part of the inner duct through which the juice flows. This portion therefore includes the outlet orifice for the juice.

As a variant, the cannula and the bottom wall can constitute a single piece.

It is understood that when the bottom wall is in the obturated position, the juice flows through the wall via said portion.

Advantageously, the citrus press further includes a channel to remove the squeezed juice leaving the cannula, the channel being pivotable relative to the frame about a pivot axis between a flow position in which the channel is located below the outlet orifice of the cannula to receive the fluid, and a retracted position.

The channel has the function of receiving the juice leaving the outlet orifice to bring it to the outside of the frame, where it is collected by the user. The channel is therefore disposed below the enclosure.

Preferably, the channel communicates with a pouring spout mounted on the front of the frame.

When the cannula is in the active position, the channel is in the flow position, so as to guide the juice out of the frame of the citrus press.

When the cannula is in the release position, the channel is in the retracted position.

It is understood that, in the flow position, the channel is inclined relative to the horizontal, preferably by an angle between five and fifteen degrees, more preferably between five and ten degrees.

The pivot axis is preferably orthogonal to the axis of the enclosure. The pivot axis is located between the cannula and a second end of the channel opposite to a first end intended to face the outlet orifice when the channel is in the flow position.

Preferably, the bottom wall cooperates with the channel so that the displacement of the bottom wall towards the obturation position causes the tilting of the channel into the flow position.

To do so, the channel preferably includes an actuation finger, protruding relative to the plane of the channel, which cooperates with a peripheral edge of the bottom wall. As it moves towards the obturation position, the bottom wall pushes the actuation finger, which causes the rotation of the channel.

The displacement of the bottom wall towards the low position has the effect of allowing the tilting of the channel towards its retracted position thanks to the action of gravity.

In the variant where the cannula is secured to the bottom wall, the displacement of the cannula from the active position to the release position has the effect that the bottom wall and/or the cannula exert a thrust on the channel directed downwards, which causes it to pivot towards its retracted position. It is understood that, in the retracted position, the channel is preferably substantially vertical.

Advantageously, the citrus press further includes a slide which is movable between a removal position, in which it extends under the lower opening, so as to guide the removal of the squeezed fruit towards an outlet opening arranged in the lower part of the frame, and a retracted position.

The slide is in the retracted position when the cannula is in the active position.

The slide is in the removal position when the cannula is in the release position.

Preferably the slide is pivotally mounted relative to the frame, about a pivot axis which is orthogonal to the axis of the enclosure.

Preferably, the pivot axis of the slide is parallel to the pivot axis of the channel. The pivot axes of the slide and of the channel are disposed on either side of the enclosure. Also, the slide and the channel are disposed on either side of the bottom wall, so as to avoid any collision during their respective pivotal movements.

In the retracted position, the slide extends substantially vertically.

Advantageously, the bottom wall cooperates with the slide so that the displacement of the bottom wall between its obturation position and its low position causes the displacement of the slide between its retracted position and its removal position.

Preferably, the bottom wall also cooperates with the slide, in particular during the start of the phase of lowering of the bottom wall.

One advantage is that the displacement of the slide and/or of the channel does not require dedicated motorization devices.

Advantageously, the frame includes a door which is pivotable along a door axis parallel to the axis of the enclosure. This door allows a user to have access to the interior of the citrus press, in particular to carry out the cleaning or maintenance operations.

Preferably, the channel is pivotally mounted to the door about an axis of rotation orthogonal to the door axis. The channel is removably mounted to the door, which facilitates the dismounting of the channel for its cleaning. All the user has to do is open the door and detach the channel from the door.

Advantageously, the citrus press includes an inlet for the insertion of a citrus fruit, as well as a rail connecting the inlet to the upper opening of the enclosure. It is understood that the fresh fruit is inserted into the machine via the inlet and slides, thanks to the rail, into the enclosure. The inlet is preferably disposed in front of the citrus press.

The present disclosure also relates to an installation which includes a citrus press according to the present disclosure and a waste receptacle disposed under the citrus press, the receptacle communicating with the lower opening of the enclosure.

The receptacle is therefore provided for recovering the squeezed fruits.

As mentioned above, the receptacle can be large when placed under the citrus press.

Preferably, the outlet opening of the frame communicates with the waste receptacle.

The receptacle can for example be concealed under a table on which the citrus press will be laid, the table being provided with a cutout to communicate the outlet opening of the frame with the receptacle.

DESCRIPTION OF THE DRAWINGS

The present disclosure will be better understood upon reading the following description of one embodiment of the present disclosure given by way of non-limiting example, with reference to the accompanying drawings, in which:

FIG. 1 is a general view of one exemplary embodiment of the citrus press according to the present disclosure;

FIG. 2 is a sectional side view of the citrus press of FIG. 2, illustrating the insertion of a fruit into the citrus press;

FIG. 3 is a detail view of the enclosure of the citrus press of FIG. 2, the membrane being partially inflated to center the fruit in the enclosure;

FIG. 4 illustrates the closing of the lid of the enclosure;

FIG. 5 illustrates the step of inflating the membrane and extracting the juice, the enclosure being closed and the channel being raised;

FIG. 6 illustrates the step of lowering the cannula, opening the lid, placing the slide, removing the squeezed fruit; and FIG. 7 illustrates the step of removing the squeezed fruit towards the receptacle located under the citrus press.

DETAILED DESCRIPTION

FIG. 1 illustrates an installation 1000 for squeezing citrus fruits, this installation including a citrus press 10, which will be described in more detail below, as well as a waste receptacle 1020 which is disposed under the citrus press 10. As can be seen in this FIG. 1, the citrus press 10 is laid on a table 1040, while the waste receptacle 1020 is disposed under the table 1040. The table 1040 can be equipped with side flanges (not illustrated here) for hiding the waste receptacle 1020. This is a non-limiting example.

Alternatively, the citrus press 10 could be laid directly on the waste receptacle, the latter having for example an external contour in the continuity of the citrus press.

Referring to FIG. 1, citrus press 10 includes a frame 12 in the form of a box; the frame 12 has a front part or facade 14 which, in this non-limiting example, includes a door 16 pivotally mounted relative to a side wall 20 of the frame 12 along a door axis A, thanks to hinges 18. The door 16 provides easy access to the interior of the frame, for example for cleaning or maintenance operations.

The citrus press further includes an inlet 22 for the insertion of a fruit 1, preferably a citrus fruit, into the citrus press, this inlet being arranged in the door 16.

The citrus press further includes, in the front part, an actuation button 24, for starting and stopping the citrus press.

Finally, as illustrated in FIG. 1, the citrus press includes, in the lower part of the door, a support 26 for receiving a glass V, and a pouring spout 28 through which the juice extracted from the fruit flows.

Referring to FIGS. 2 to 7, the citrus press 10 according to the present disclosure will now described in more detail.

The citrus press 10 includes a hemispherical cup 30 which is pivotally mounted about an axis B, perpendicular to the axis of the door A, this cup 30—in the position for receiving the fruit to be squeezed—having the function of receiving the fruit to be squeezed and, by rotation about the axis B, of guiding the fruit 1 in the frame and obturating the inlet 22.

The citrus press 10 includes an enclosure 40 which is disposed in the frame 12 and which has a wall 42 delimiting a cavity 44 for receiving the fruit to be squeezed 1 containing a juice.

The enclosure here has a cylindrical shape with a vertical axis C.

The enclosure also includes an upper opening 46 for introducing the fruit to be squeezed 1 into the cavity 44.

To guide the fruit to be squeezed 1 towards the cavity, the citrus press further includes a rail 48 which connects the inlet 22 to the upper opening 46 of the enclosure 44. According to one variant, the hemispherical cup 30 can include the rail 48, so that the rail pivots with the hemispherical cup. When the cup is in the receiving position, the rail obturates the inlet 22 of the machine. One advantage is to prevent the introduction of foreign bodies into the machine through the inlet 22 when the cup is in the receiving position.

The citrus press further includes a membrane 50 which is extensible and disposed in the cavity. In this example, the membrane 50 is made of silicone or EPDM. The membrane 50 extends over the peripheral part of the cylindrical wall of the cavity 44, so as to surround the fruit to be squeezed when it is in the enclosure. It is therefore understood that in the resting state, the deflated membrane has a substantially cylindrical shape with axis C.

The citrus press also includes a pneumatic inflation device 51 comprising a mini-compressor 51*a* connected to a compressed-air container 51*b*. The inflation device is disposed in the frame and is connected to the enclosure 40 via a pipe 52. The inflation device 51 is configured to inflate the extensible membrane 50, so as to compress the fruit to be squeezed 1 fitted onto the cannula to extract the fluid therefrom. Preferably, the inflation pressure of the membrane is between three and six bars. As illustrated in FIG. 3, the pipe 52 cooperates in this example with a fitting 54 which passes through the peripheral wall 42 so as to open out between the wall and the membrane 50. The inflation device 51 further includes a pneumatic distributor 51*c* connected to the container 51*b* and to the different actuators of the citrus press.

It is understood that the injection of compressed air between the wall and the membrane has the effect of inflating the membrane, which causes the reduction of the volume of the cavity 44, and therefore the squeezing of the fruit and the extraction of the juice, as will be explained below.

The citrus press 10 also includes a cannula 60 which has an elongated cylindrical shape, a tip-shaped end 62 and a lower end part 64 opposite to the upper end 62. The cannula 60 includes perforations 66 arranged on its peripheral cylindrical wall. In this non-limiting example, the perforations are longitudinal. They could have another shape without departing from the scope of the present disclosure. The cannula extends parallel to the axis C of the enclosure 44 and, in this example, the cannula has an axis which is coaxial with the axis C of the enclosure.

The cannula 60 also includes an inner duct 68 which is connected to the perforations 66 on the one hand, and to an outlet orifice 70 on the other hand; this outlet orifice 70 being disposed below the cavity 44 for the removal of the fluid from the cannula 60. It is understood that the cannula 60 is shaped to penetrate the citrus fruit and collect the juice from the fruit.

In accordance with the present disclosure, the citrus press 10 further includes a displacement device 80 for moving the cannula 60 in translation relative to the enclosure 40 along a first direction of displacement D1 which is parallel to the axis C of the enclosure 40. In this example, the displacement device 80 is constituted by a cylinder 82, preferably a pneumatic cylinder. As a variant, an electric cylinder or a motorized rack could be used.

In this example, the first direction of displacement D1 is vertical.

The displacement device 80 is configured to move the cannula in translation between:

- an active position, illustrated in FIG. 5 in which the cannula extends at least partly into the enclosure to fit the fruit to be squeezed 1, and:
- a release position, illustrated in particular in FIGS. 6 and 7 in which the cannula is disposed below the enclosure to allow the release of the squeezed fruit out of the enclosure through a lower opening 86 of the enclosure 40.

As can be seen in FIGS. 2 to 5, the cannula also has an intermediate position, between the active position and the release position, in which only the upper part 60*a* of the cannula 60 extends into the cavity 44. More exactly, in this example, the top 61 of the cannula 60 is in an intermediate position, substantially in the middle of the cavity 44.

The citrus press further includes a lid 90 which is configured to obturate the upper opening 46. In this example, the lid is movably mounted so as to pivot relative to the enclosure 40 about an axis of rotation E which is perpendicular to the axis of the enclosure C. The lid 90 is movable relative to the enclosure 40 between an open position—illustrated in particular in FIG. 2—allowing the fruit to be squeezed 1 to enter the enclosure via the upper opening 46, and a closed position—illustrated in particular in FIGS. 4 and 5—in which the upper opening 46 is obturated by the lid 90.

The citrus press includes a lid actuation device 92, in this case a pneumatic cylinder 94 which has a body 94*a* pivotally mounted relative to the frame about an axis X1. The cylinder 94 include a rod 94*b* which is pivotally mounted relative to the lid 90 about a pivot axis X2 opposite to the first pivot axis E of the lid.

It is understood that the actuation of the actuator 94 has the effect of pivoting the lid 90 about the first pivot axis E.

The citrus press 10 further includes a bottom wall 96 which is configured to obturate the lower opening 86 of the enclosure 40. In this example, the cannula is fixed perpendicularly to the bottom wall 96. More specifically, the cannula 60 passes through the bottom wall 96.

The bottom wall is movable in translation relative to the enclosure along a second direction of displacement D2 which is in this example parallel to the first direction of displacement D1. The first and second directions of displacement D1, D2 are parallel to the axis C of the enclosure. This displacement takes place between an obturation position—illustrated in FIG. 5—in which the bottom wall 96 obturates the lower opening 86, and a low position—illustrated in FIG. 6—in which the squeezed fruit 1 can leave the cavity through the lower opening 86.

The bottom wall also has an intermediate position, illustrated in FIGS. 2 and 4.

The cannula 60 also has a portion 60*b* which extends below the bottom wall 96. As can be observed in FIG. 2, the outlet orifice 70 is arranged in this portion 60*b*.

Referring to FIG. 5, it is observed that the citrus press 10 further includes a channel 100 for removing the squeezed juice leaving the cannula 60. This channel is pivotable relative to the frame about an axis of rotation F which is orthogonal to the axis C of the enclosure between a flow position—illustrated in FIG. 5—in which the channel is located below the outlet orifice 70 of the cannula 60 to receive the fluid, and a retracted position illustrated in particular in FIG. 2. In the retracted position, the channel 100 is substantially vertical, while in the flow position, the channel 100 presents a slight inclination relative to the horizontal, at an angle β of the order of seven degrees, in order to facilitate the flow of the juice. As understood with FIG. 5, the channel 100 has an upstream portion 100*a* which is disposed under the outlet orifice 70 and a downstream position 100*b*, opposite to the upstream position 100*a*, which is in communication with the pouring spout 28. In this example, the axis of rotation F is disposed in the vicinity of the upstream position and the channel 100 is freely rotatable about the axis of rotation F, so that the channel tends to pivot towards its retracted position under the action of gravity.

In other words, the extracted juice leaves the cannula through the outlet orifice 70, flows along the channel 100, flows into the pouring spout 28 then into the glass V.

As observed in FIG. 4, the bottom wall 96 cooperates with the channel 100 so that the displacement of the bottom wall towards its low position drives the channel in the retracted position. Indeed, the bottom wall comes into contact with the channel and, by its downward movement towards its low position, causes the channel 100 to pivot towards its retracted position.

The citrus press further includes a slide 110—visible in particular in FIG. 6—which is pivotally movable between a removal position, illustrated in FIG. 6, in which it extends under the lower opening 86 of the enclosure, so as to guide the removal of the squeezed fruit 1 towards an outlet opening 120 arranged in the lower part 12*b* of the frame 12. The slide 110 also has a retracted position, illustrated in particular in FIG. 5. The slide is therefore pivotally mounted about an axis of rotation G, which is orthogonal to the axis of the enclosure C.

The bottom wall 96 cooperates with the slide 110 so that the displacement of the bottom wall between its obturation position and its low position causes the displacement of the slide between its retracted position and its removal position. It is understood from the foregoing that, according to the disclosure, the channel and the slide are pivoted thanks to the displacement of the cannula and of the bottom wall, without resorting to dedicated motorized devices.

FIG. 7 illustrates the installation 1000, this figure illustrating the fact that the waste receptacle 1020 communicates with the lower opening 86 of the enclosure, while the outlet opening 120 of the frame communicates with the waste receptacle 1020.

The principle of operation of the citrus press 10 described above is as follows. After having turned on the apparatus and placed a glass V under the pouring spout, the user inserts a fruit to be squeezed 1 into the citrus press via the cup 30. The fruit 1 slides on the rail and enters the enclosure 40 via the upper opening 46, the lid 90 being in the open position. According to one preferred variant, the membrane 50 is pre-inflated before the arrival of the fruit 1 so that the latter is immediately centered in the cavity, which makes it possible to reduce the cycle time. The lid 90 is then brought into the closed position.

Concomitantly, the cannula is moved into the active position so as to fit the fruit 1, while the bottom wall 96 is brought into the obturation position to obdurate the lower opening 86 of the enclosure 40. As the cannula is secured to the bottom wall, it is understood that the bottom wall is in the obturation position when the cannula is in the active position. At the same time, the channel 100 pivots into its flow position thanks to the contact between the bottom wall 96 and an actuation finger 101 fixed to the channel. During its displacement towards the obturation position, the bottom wall 96 pushes the actuation finger 101 upwards, which causes the rotation of the channel towards the flow position.

In the same movement, the slide 110 tilts into the retracted position under the action of the cannula and of the bottom wall.

The membrane 50 is then inflated to crush the fruit and extract the juice therefrom via the perforations 60 and the inner duct of the cannula. The juice flows along the channel towards the pouring spout 28, before flowing into the glass V.

After extraction of the juice, the lid is brought into the open position, while the cannula 60 and the bottom wall 96 are brought into the release position, respectively into the low position. Concomitantly, the slide tilts towards its removal position and the membrane deflates, freeing the squeezed fruit 1 which leaves the enclosure under the action of gravity and falls into the receptacle 1020 while being guided by the slide 110. At the same time, the channel 100 tilts into the retracted position under the action of gravity.

The next user can then introduce a new fruit into the citrus press.

The invention claimed is:

1. A citrus press comprising:

a frame;

an enclosure disposed in the frame and having a wall delimiting a cavity for receiving a fruit to be squeezed containing a fluid, the enclosure having an axis, a upper opening for the introduction of the fruit to be squeezed into the cavity, and a lower opening;

an extensible membrane disposed in the cavity and extending over all or part of the wall so as to surround the fruit to be squeezed when it is in the enclosure, a cannula provided with at least one perforation, the cannula extending parallel to the axis of the enclosure and being configured to be engaged in the fruit to be squeezed, the cannula including an inner duct connecting the perforation to an outlet orifice disposed below the cavity for the removal of the fluid from the cannula;

an inflation device configured to inflate the extensible membrane, so as to compress the fruit to be squeezed fitted onto the cannula in order to extract the fluid therefrom;

wherein the citrus press further includes;

a displacement device for moving the cannula in translation relative to the enclosure along a first direction of displacement parallel to the axis, between an active position in which the cannula extends at least partly into the enclosure to fit the fruit to be squeezed and a release position in which the cannula is disposed below the enclosure to allow the release of the squeezed fruit out of the enclosure through a lower opening of the enclosure, and a bottom wall configured to obturate the lower opening of the enclosure, the bottom wall being movable relative to the enclosure along a second direction of displacement parallel to the axis of the enclosure, between an obturation position in which the bottom wall obturates at least part of the lower opening, and a low position.

2. The citrus press according to claim 1, further comprising a lid configured to obturate the upper opening, the lid being movable relative to the enclosure between an open position allowing the fruit to be squeezed to enter the enclosure via the upper opening, and a closed position in which the upper opening is obturated.

3. The citrus press according to claim 2, wherein the lid is pivotally mounted relative to the enclosure about a first pivot axis which is orthogonal to the axis of the enclosure.

4. The citrus press according to claim 1, wherein the bottom wall is secured to the cannula.

5. The citrus press according to claim 4, wherein the cannula has a portion extending below the bottom wall.

6. The citrus press according to claim 1, further comprising a channel to remove the squeezed juice leaving the cannula, the channel being pivotable relative to the frame between a flow position in which the channel is located below the outlet orifice of the cannula to receive the fluid, and a retracted position.

7. The citrus press according to claim 6, wherein the bottom wall cooperates with the channel so that the displacement of the bottom wall towards the obturation position causes the tilting of the channel into the flow position.

8. The citrus press according to claim 1, further comprising a slide which is movable between a removal position, in which it extends under the lower opening, so as to guide the removal of the squeezed fruit towards an outlet opening arranged in the lower part of the frame, and a retracted position.

9. The citrus press according to claim 1, wherein the bottom wall cooperates with the slide so that the displacement of the bottom wall between its obturation position and its low position causes the displacement of the slide between its retracted position and its removal position.

10. The citrus press according to claim 1, wherein the frame includes a door which is pivotable along a door axis parallel to the axis of the enclosure.

11. The citrus press according to claim 10, wherein the channel is pivotally mounted to the door about an axis of rotation orthogonal to the door axis.

12. The citrus press according to claim 1, wherein it includes an inlet for the insertion of a citrus fruit, as well as a rail connecting the inlet to the upper opening of the enclosure.

13. An installation including a citrus press comprising:

a frame;

an enclosure disposed in the frame and having a wall delimiting a cavity for receiving a fruit to be squeezed containing a fluid, the enclosure having an axis, a upper opening for the introduction of the fruit to be squeezed into the cavity, and a lower opening;

an extensible membrane disposed in the cavity and extending over all or part of the wall so as to surround the fruit to be squeezed when it is in the enclosure, a cannula provided with at least one perforation, the cannula extending parallel to the axis of the enclosure and being configured to be engaged in the fruit to be squeezed, the cannula including an inner duct connecting the perforation to an outlet orifice disposed below the cavity for the removal of the fluid from the cannula;

an inflation device configured to inflate the extensible membrane, so as to compress the fruit to be squeezed fitted onto the cannula in order to extract the fluid therefrom;

wherein said citrus press further includes:

a displacement device for moving the cannula in translation relative to the enclosure along a first direction of displacement parallel to the axis, between an active position in which the cannula extends at least partly into the enclosure to fit the fruit to be squeezed and a release position in which the cannula is disposed below the enclosure to allow the release of the squeezed fruit out of the enclosure through a lower opening of the enclosure;

said installation further comprising a waste receptacle disposed under the citrus press, the waste receptacle communicating with the lower opening of the enclosure, and a slide which is movable between a removal position, in which it extends under the lower opening, so as to guide the removal of the squeezed fruit towards an outlet opening arranged in the lower part of the frame, and a retracted position, wherein the outlet opening communicates with the waste receptacle.

14. A citrus press comprising:

a frame;

an enclosure disposed in the frame and having a wall delimiting a cavity for receiving a fruit to be squeezed containing a fluid, the enclosure having an axis, an upper opening for the introduction of the fruit to be squeezed into the cavity, and a lower opening; and a slide which is movable between a removal position, in which it extends under the lower opening of the enclosure, so as to guide the removal of the squeezed fruit towards an outlet opening arranged in a lower part of the frame, and a retracted position.

15. The citrus press of claim 14, wherein the outlet opening communicates with the waste receptacle.

16. The citrus press of claim 14, further comprising:

an extensible membrane disposed in the cavity and extending over all or part of the wall so as to surround the fruit to be squeezed when it is in the enclosure; and a cannula provided with at least one perforation, the cannula extending parallel to the axis of the enclosure and being configured to be engaged in the fruit to be squeezed, the cannula including an inner duct connecting the perforation to an outlet orifice disposed below the cavity for the removal of the fluid from the cannula.

17. The citrus press of claim 16, further comprising:

an inflation device configured to inflate the extensible membrane, so as to compress the fruit to be squeezed fitted onto the cannula in order to extract the fluid therefrom.

* * * * *